No. 681,025. Patented Aug. 20, 1901.
V. HUBERTI.
SAFETY DEVICE FOR AUTOMOTOR VEHICLES.
(Application filed Mar. 29, 1901.)
(No Model.)

WITNESSES:
George B. Geibel
Harry S. Fox

INVENTOR
Victor Huberti
BY
ATTORNEYS.

THE NORRIS PETERS CO., PHOTO-LITHO., WASHINGTON, D. C.

UNITED STATES PATENT OFFICE.

VICTOR HUBERTI, OF BERLIN, GERMANY.

SAFETY DEVICE FOR AUTOMOTOR-VEHICLES.

SPECIFICATION forming part of Letters Patent No. 681,025, dated August 20, 1901.

Application filed March 29, 1901. Serial No. 53,444. (No model.)

*To all whom it may concern:*

Be it known that I, VICTOR HUBERTI, watchmaker, a citizen of the German Empire, residing at 13 Rankestrasse, Berlin, Germany, have invented certain new and useful Improvements in Safety Devices for Automotor-Vehicles; and I do hereby declare the following to be a full, clear, and exact description of the invention, such as will enable others skilled in the art to which it appertains to make and use the same.

The present invention relates to a safety device which can be easily provided on automotor-vehicles. The purpose of the said device is to reliably prevent the severe injury to persons, articles, and the like who or which come into the path of the vehicle through carelessness or other cause.

An essential feature of the device is that obstructions lying in the path of the vehicle are automatically conveyed into a net provided behind the safety device. Violent concussions cannot take place on the impact of the safety device, since both concussion and dragging are entirely impossible. The operation of the safety device is therefore perfect, since the obstruction in question reaches the receiving or catching net uninjured.

Figure 1:
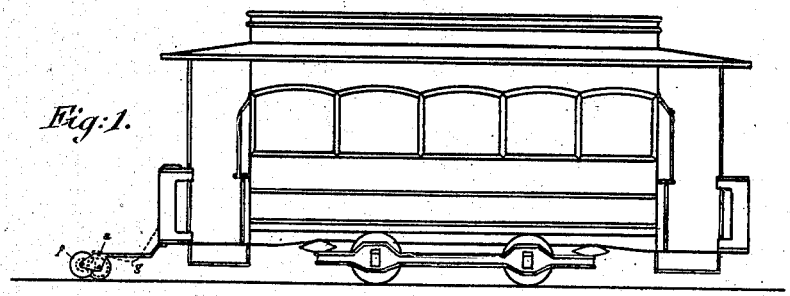
Figure 2:
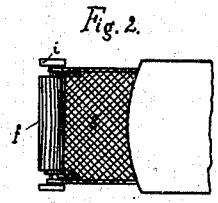
Figure 3:
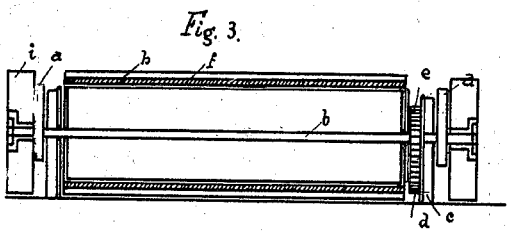
Figure 6:
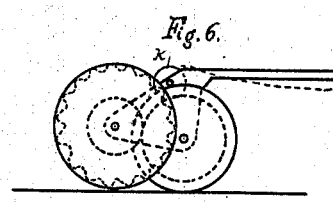
Figure 4:
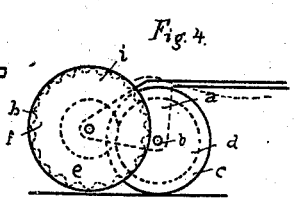
Figure 7:
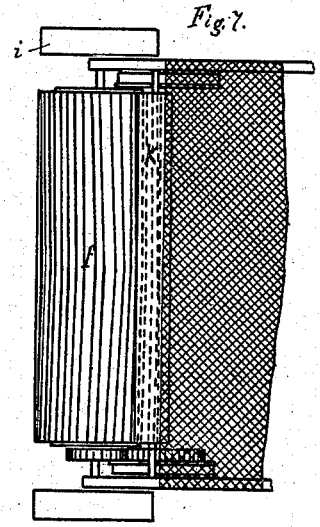
Figure 5:
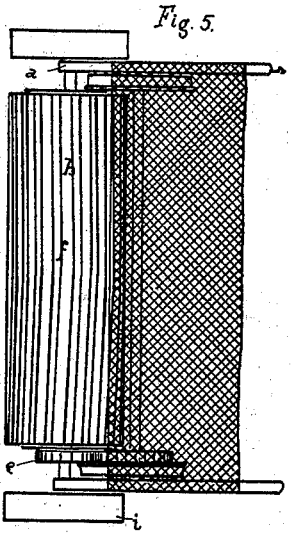

In the annexed drawings, Figure 1 represents a front view of a motor-vehicle, and Fig. 2 a plan view showing the safety device in connection with the motor-vehicle. Fig. 3 represents a front view of the safety device with the transport-roller in section. Fig. 4 represents a side view of the safety device on a larger scale, and Fig. 5 a plan view thereof. Figs. 6 and 7 represent a side view and a plan of the safety device, with a guide-roller arranged behind the transport-roller.

As will be seen in Figs. 1 and 4, the safety device consists of a frame $a$, loosely connected with the front parts of the vehicle. In the said frame $a$ a shaft $b$, with running rollers $c$, has bearing. The said rollers $c$ enter the rail-grooves. Fixed to the shaft $b$ is a toothed wheel $d$, Figs. 4 and 5, which gears with the pinion $e$, driving the transport-roller $f$. By this arrangement the transport-roller $f$ is caused to revolve in the direction opposite to that in which the vehicle is traveling, so that a body received by it is conveyed backward.

To prevent the occurrence of a violent concussion on the impact of the transport-rollers with an obstruction, the former are made of india-rubber or the like in the same manner as the pneumatic tires of cycles—that is to say, with an elastic tube inside filled with compressed air—thus causing the roller which forms the jacket or cover thereof to retain its shape. The great advantage of this construction lies in the fact that the resiliency of the transport-roller can be suited to varying requirement by altering the pressure of the air therein.

On the outer circumference of the transport-roller $f$ are ribs $h$, Fig. 4, which slant toward the center of the roller for the purpose of conveying an obstruction taken up toward the center of the receiving-net $g$. The said ribs $h$ consist of india-rubber or the like and have sharp edges, so that bodies are easily gripped and conveyed toward the receiving-net $g$ independently of the nature of such bodies. The roller $f$ is arranged in the frame in such a manner as to normally be but slightly removed from the level of the ground. If, therefore, the said transport-roller $f$ meets a body lying between the rails, the elasticity of the roller causes its shape to change, and it therefore comes into contact with the surface of the track. The edges of the ribs on the roller seize the body, which is automatically conveyed to the receiving-net $g$ by the backward rotation of the roller, and therefore cannot possibly get underneath the transport-roller.

In order to prevent the possibility of a body lying transversely to the course and therefore across the rails from being injured by a forcible concussion on the impact of the safety device, the following arrangement is made: The shaft of the transport-roller is lengthened on both sides, and on the extensions thereof are placed elastic india-rubber rollers like pneumatic or cushion tires. The diameter of the said elastic rollers $i$ is at least as large as that of the transport-roller $f$. The arrangement described is executed in such a manner that only a small space remains between the ends of the transport-roller and the other roller. To render it possible for the body taken up by the transport-roller to be conveyed surely and without much resistance to the receiving-net, an elastic guide-roller $k$ is arranged at a suitable height and distance behind the transport-roller, the said guide-roller being loosely supported in the frame $a$. The body taken up by the transport-roller is thus first conveyed to the guide-roller and easily rolls over the latter into the net.

The safety device described is primarily characterized by the great simplicity of its construction, and it answers all the requirements of such devices with regard to the reliability and safety of its action. It may be specially emphasized that the said safety device immediately comes into operation at the moment of danger independently of the driver of the vehicle.

It is evident that slight changes in the arrangement and construction of the above-described safety device for motor-vehicles may be made without departing from the spirit of my invention.

Having now particularly described and ascertained the nature of my said invention and in what manner the same is to be performed, I declare that what I claim is—

1. A safety device for vehicles, the same consisting of a frame suitably supported on the vehicle, an elastic transport-roller provided with exterior flexible slanting ribs converging at the mid-length of the roller, means for revolving said roller, and a receiving-net behind the said roller, substantially as set forth.

2. A safety device for vehicles, the same consisting of a frame adapted to be supported on a vehicle, an elastic transport-roller journaled at the front end of the frame, said transport-roller being provided with exterior flexible slanting ribs converging at the mid-length of said roller, means for revolving the transport-roller, a guide-roller suitably supported behind, at the top of, and in contact with the transport-roller, and a receiving-net supported on the frame behind the said rollers, substantially as set forth.

3. A safety device for vehicles, the same consisting of a frame adapted to be supported on a vehicle, an elastic transport-roller journaled in the front end of said frame, said roller being provided with exterior flexible slanting ribs converging at the mid-length of the roller, end rollers at a short distance beyond the ends of and arranged on the shaft of the transport-roller, means for revolving said rollers, and a receiving-net behind the transport-roller, substantially as set forth.

In testimony whereof I affix my signature in presence of two witnesses.

VICTOR HUBERTI.

Witnesses:
WOLDEMAR HAUPT,
HENRY HASPER.